US012165107B2

(12) United States Patent
Bever et al.

(10) Patent No.: US 12,165,107 B2
(45) Date of Patent: Dec. 10, 2024

(54) PROACTIVE CONFLICT RESOLUTION IN NODE-BASED COLLABORATION SYSTEMS

(71) Applicant: Disney Enterprises, Inc., Burbank, CA (US)

(72) Inventors: Rebecca Bever, Burbank, CA (US); Julianne Hope Groves, Altadena, CA (US); Jo Lockman, Los Angeles, CA (US); Mara Idai Lucien, Los Angeles, CA (US); Erika Varis Doggett, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 17/570,289

(22) Filed: Jan. 6, 2022

(65) Prior Publication Data

US 2022/0215343 A1     Jul. 7, 2022

Related U.S. Application Data

(60) Provisional application No. 63/134,880, filed on Jan. 7, 2021.

(51) Int. Cl.
*G06Q 10/101*     (2023.01)
*G06F 21/62*     (2013.01)
*G06Q 10/0631*     (2023.01)

(52) U.S. Cl.
CPC ....... *G06Q 10/101* (2013.01); *G06F 21/6218* (2013.01); *G06Q 10/063114* (2013.01); *G06F 2221/2141* (2013.01)

(58) Field of Classification Search
CPC .......... G06Q 10/101; G06Q 10/063114; G06F 21/6218; G06F 2221/2141
See application file for complete search history.

(56) References Cited

U.S. PATENT DOCUMENTS 8,600,793 B2    12/2013   Wang et al.
8,738,414 B1    5/2014   Nagar et al.
(Continued)

OTHER PUBLICATIONS

Brindescu, Caius, et al. "Planning for untangling: Predicting the difficulty of merge conflicts." Proceedings of the ACM/IEEE 42nd International Conference on Software Engineering. 2020. (Year: 2020).*

(Continued)

*Primary Examiner* — Corey Russ
(74) *Attorney, Agent, or Firm* — Farjami & Farjami LLP

(57) ABSTRACT

A system includes processing hardware, a user interface (UI), and a system memory storing a software code. The processing hardware executes the software code to receive from a first user, via the UI, project data identifying a project including multiple tasks, determine, using the project data, a node-based graph of the project including the tasks, receive from a first user or a second user via the UI, task action data producing a modification to the node-based graph, and identify, based on the modification to the node-based graph, one of a conflict or a potential future conflict among at least two nodes of the node-based graph. The software code further identifies a conflict avoidance strategy for resolving the conflict or preventing the potential future conflict, and displays, via the UI, the conflict avoidance strategy to the first user or the second user, or performs the conflict avoidance strategy.

8 Claims, 11 Drawing Sheets

(56) References Cited

U.S. PATENT DOCUMENTS

| | | | |
|---|---|---|---|
| 11,109,099 | B1 | 8/2021 | Doggett et al. |
| 2003/0069869 | A1* | 4/2003 | Gronau .................. G06Q 10/06 706/46 |
| 2003/0101089 | A1* | 5/2003 | Chappel ........... G06Q 10/06313 705/7.17 |
| 2005/0114829 | A1* | 5/2005 | Robin .................... G06Q 10/06 717/101 |
| 2005/0229151 | A1* | 10/2005 | Gupta .................... G06Q 10/06 717/101 |
| 2006/0044307 | A1* | 3/2006 | Song ..................... G06T 11/206 345/419 |
| 2007/0129976 | A1* | 6/2007 | Hochberg ............ G06Q 10/063 705/7.11 |
| 2007/0171224 | A1 | 7/2007 | MacPherson |
| 2009/0144098 | A1 | 6/2009 | Korat et al. |
| 2009/0144365 | A1 | 6/2009 | Korat et al. |
| 2011/0022437 | A1* | 1/2011 | Mundy .................. G06Q 10/10 705/7.23 |
| 2011/0078426 | A1 | 3/2011 | Stoitsev |
| 2011/0099158 | A1* | 4/2011 | Magnuson ............. G06Q 10/04 707/E17.108 |
| 2011/0107231 | A1 | 5/2011 | Gueldemeister |
| 2012/0016713 | A1* | 1/2012 | Wilcock ................ G06F 9/5038 705/348 |
| 2012/0151495 | A1* | 6/2012 | Burckhardt ............ G06F 9/485 718/106 |
| 2013/0024235 | A1* | 1/2013 | Willems ................. G06Q 10/06 705/7.23 |
| 2013/0151421 | A1* | 6/2013 | Van Der Ploeg ...... G06Q 10/06 705/301 |
| 2014/0012616 | A1 | 1/2014 | Moshenek |
| 2015/0006232 | A1* | 1/2015 | Anaby-Tavor ... G06Q 10/06316 705/7.26 |
| 2015/0254597 | A1* | 9/2015 | Jahagirdar ..... G06Q 10/063118 705/7.15 |
| 2016/0004759 | A1 | 1/2016 | Ramakrishnan |
| 2017/0236081 | A1 | 8/2017 | Grady Smith et al. |
| 2018/0114178 | A1* | 4/2018 | Asokan ................ G06Q 10/109 |
| 2019/0130330 | A1* | 5/2019 | Slagle ............ G06Q 10/063114 |
| 2019/0155870 | A1* | 5/2019 | Prakash ................ G06F 40/103 |
| 2019/0251486 | A1 | 8/2019 | Gottemukkala et al. |
| 2019/0325056 | A1* | 10/2019 | Sloane .................. G06F 16/248 |
| 2020/0210931 | A1* | 7/2020 | Idan ................. G06Q 10/08355 |
| 2021/0060779 | A1* | 3/2021 | Dupuis .................. B25J 9/0084 |

OTHER PUBLICATIONS

Pham, Manh Tung, and Kiam Tian Seow. "Multiagent conflict resolution planning." 2013 IEEE International Conference on Systems, Man, and Cybernetics. IEEE, 2013. (Year: 2013).*

U.S. Appl. No. 17/202,189 "Techniques for Personalizing the Playback of a Media Title Based on User Interactions with an Internet of Things Device" filed Mar. 15, 2021 pp. 1-63.

"Action Recognition: Papers with code." https://paperswithcode.com/task/action-recognition-in-videos pp. 1-11.

Rohit Ghosh. "Deep Learning for Videos: a 2018 Guide to Action Recognition", Qure.ai Blog, Revolutionizing Healthcare with deep learning. Jun. 11, 2018 pp. 1-20.

Kamal Ali and Steven P. Ketchpel. "Golden Path Analyzer: Using Divide-and-Conquer to Cluster Web Clickstreams". Jan. 2003 pp. 1-10.

Wengong Jin, Regina Barzilay, and Tommi Jaakkola. "Hierarchical Generation of Molecular Graphs using Structural Motifs", ICML Feb. 8, 2020. pp. 1-14.

"Provision Infrastructure as Code". AWS CloudFormation, Amazon Web Services https://aws.amazon.com/cloudformation pp. 1-6.

"ShotGrid. Get Prices & Buy ShotGrid: Formerly Shotgun Software". https://www.autodesk.com/products/shotgrid/overview pp. 1-8.

"ShotGrid Rv: a Digital Review Tool for Film, TV, and Games". https://www.shotgridsoftware.com/rv/ pp. 1-7.

"Storage: Ways to provide both long-term and temporary storage to Pods in your cluster". https://kubernetes.io/docs/concepts/storage/_print/ pp. 1-53.

Kanigalpula Samanvi and Naveen Sivadasan. "Subgraph Similarity Search in Large Graphs". 2015 pp. 1-10.

"USD Basics: Introduces a number of USD concepts, and how they relate to Houdini's USD support". https://www.sidefx.com/docs/houdini/solaris/usd.html pp. 1-17.

"USD Home: Universal Scene Description" https://graphics.pixar.com/usd/release/index.html pp. 1-2.

File History of U.S. Appl. No. 17/570,278, filed Jan. 6, 2022, titled Node-Based Control and Collaboration Systems.

C. Brindescu, I. Ahmed, R. Leano and A. Sarma, "Planning for Untangling: Predicting the Difficulty of Merge Conflicts," in 2020 IEEE/ACM 42nd.

International Conference on Software Engineering (ICSE), Seoul, 2020 pp. 801-811.

* cited by examiner

PROACTIVE CONFLICT RESOLUTION IN NODE-BASED COLLABORATION SYSTEMS

RELATED APPLICATIONS

The present application claims the benefit of and priority to Provisional Patent Application Ser. No. 63/134,880 filed on Jan. 7, 2021, and titled "Node-Based Control and Collaboration System," which is hereby incorporated fully by reference into the present application.

BACKGROUND

Large or complex projects increasingly require the collaboration of experts from a variety of fields who may be independent contractors, or experts affiliated with businesses or other entities independent of the initiator of the project. This need for collaboration between project initiators or "clients" and the third-parties with which they contract for collaborative services or "vendors" has led to the design of workflows to manage and synchronize the distribution and modification of data relevant to the collaborative project. Existing collaboration solutions typically result in both clients and their vendors being in possession of copies of substantially the same data. That duplication and proliferation of data is undesirable because it increases the cost and time required to ensure data consistency and security. In addition, the relative success or failure of collaborative projects may rely on marketplace or business changes that occur dynamically during work on the project and which may not be known to all vendors, resulting in conflicts or inconsistencies among the work product of different vendors working independently on different tasks of a common project. Consequently, there remains a need in the art for a solution enabling multidisciplinary collaboration and conflict avoidance for the successful management of complex projects in a dynamically changing project environment.

DETAILED DESCRIPTION

Figure 1:
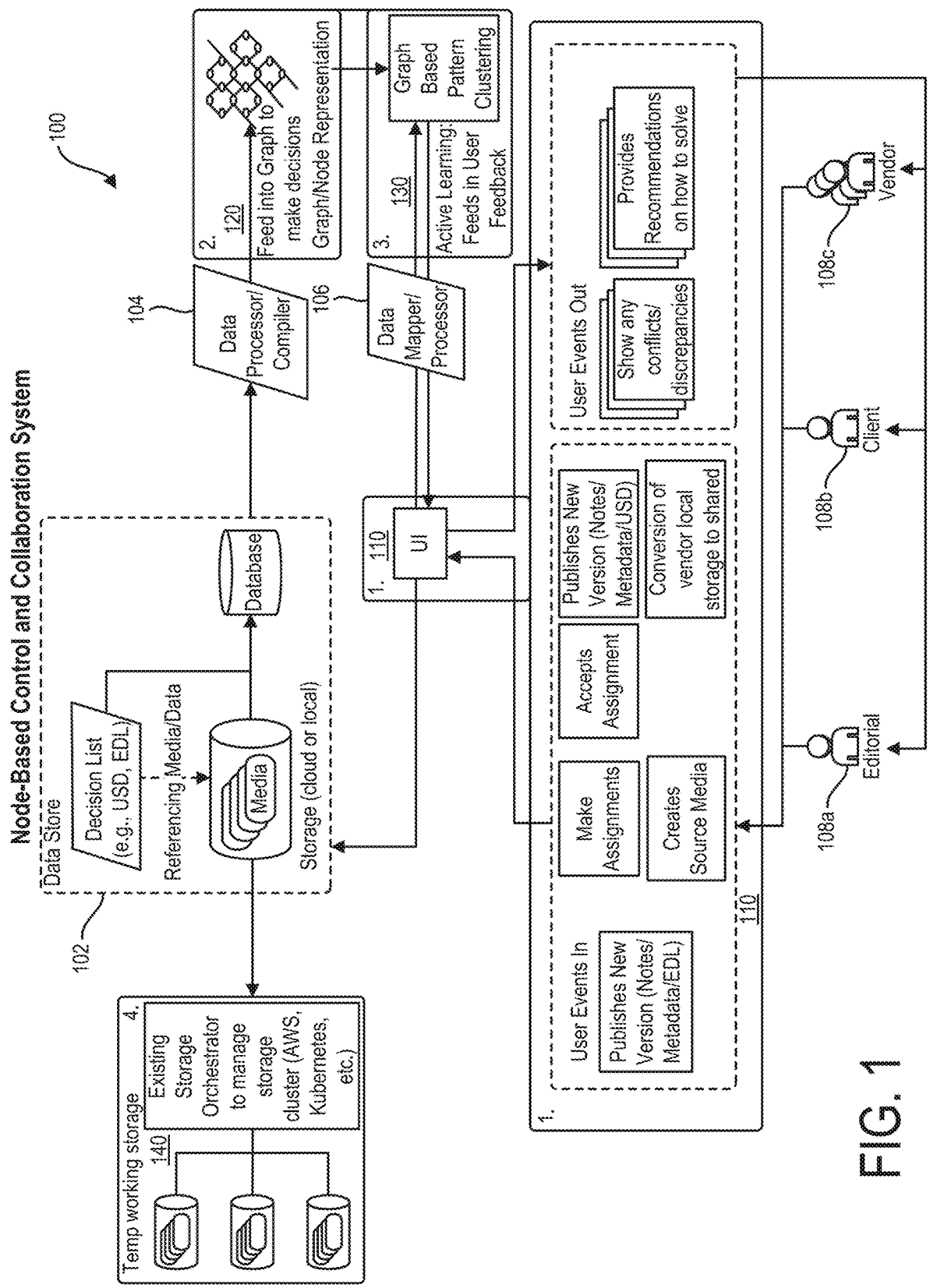
FIG. 1 shows a diagram of a node-based collaboration system, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals.

The present application discloses systems and methods for performing proactive conflict resolution in node-based collaboration systems. The novel and inventive concepts disclosed herein advantageously render a substantially seamless collaboration solution that increases efficiency by facilitating conflict resolution among collaborators while ensuring that executive control over a creative asset or other proprietary data is retained by the appropriate entities. It is noted that although the present collaboration solution is described below in detail by reference to its use in a media-based environment, such as a television (TV) or feature film production environment, the present novel and inventive principles may more generally be utilized to ensure data control and enhance collaboration efficiency for substantially any data processing application.

With respect to the specific and merely exemplary use case described herein, it is noted that the need for collaboration between project initiators (e.g., production studios) (hereinafter "clients") and the third-parties with which they contract for creative services (hereinafter "vendors") has led to the design of workflows to manage and synchronize the distribution and modification of creative assets. These existing collaborative processes typically synchronize versioned media and associated notes back and forth among vendors and clients. Consequently, and as noted above, existing collaboration solutions tend to result in both clients and their vendors being in possession of copies of substantially the same data. As further noted above, such duplication and proliferation of data is undesirable because it increases the cost and time required to ensure data consistency and security.

The present application discloses a centralized node-based solution to assist in streamlining collaboration between clients and their vendors in an exemplary media-based environment. The present proactive conflict resolution solution for node-based collaboration systems advantageously enables clients to make assignments to their vendors through one unified system, and to be informed when a new version of a creative asset has been delivered, as well as what metadata associated with that creative asset has changed, while providing an environment that enables concurrent collaboration by multiple users (e.g., clients, editors, and vendors). In addition, the node-based collaboration disclosed in the present application advantageously enables vendors to keep track of assignments and notes from clients, flag changes to creative assets or their metadata, confirm to clients that their requests have been addressed, and analyze changes to a version of a creative asset before that version is sent back to the client for review and approval. Examples of changes to a version of a creative asset may include tuning color, addition of motion blur, timecode adjustments, shot retiming, exposure adjustment, edge work, and keying, to name merely a few.

Regarding the term "conflict," as defined for the purposes of the present application, a "conflict" refers to inconsistent or incompatible features of an asset or project that are produced or predicted to be produced by changes to the asset or project, where the changes are introduced by a collaborating vendor or client. Moreover, with respect to the term "shot," as defined for the purposes of the present application, a "shot" refers to a continuous series of video frames that are captured from a unique camera perspective without cuts and other cinematic transitions. Moreover, as used herein, the term "sequence" refers to a segment of video including multiple shots in a particular order. In various implementations, a sequence of video may correspond to a portion of a scene composed of multiple shots, or to one or more of such scenes. It is also noted that the acronyms EDL and USD referred to in the present disclosure or identified in the accompanying Figures have their customary meaning in the art. Thus "EDL" denotes Edit Decision List, while "USD" denotes Universal Screen Descriptor, as those features are well known in the art.

Referring to FIG. 1, FIG. 1 shows an overview of node-based collaboration system 100. As shown in FIG. 1, node-based collaboration system 100 includes user interface 110 (hereinafter "UI 110"), node-based distribution and collaboration subsystem 120, automated conflict resolution and recommendation subsystem 130 executing a conflict avoidance software code, and automated memory space 140 providing temporary storage of creative assets during collaboration, as well as data processor/compiler 104, and data mapper/processor 106 configured to provide data for displaying decisions, conflicts, and dependencies. As further shown in FIG. 1, node-based collaboration system 100 may further include long-term data storage 102, which may store one or more of a conflict database including conflict resolution rules, and a trained conflict avoidance machine learning model, which may be trained using reinforcement learning, for example. Also shown in FIG. 1 are various users of node-based collaboration system 100 (hereinafter "users 108a-108c"), including exemplary editor 108a, exemplary client 108b, and exemplary vendor 108c. Although the exemplary use case depicted in FIG. 1 includes three users 108a-108c, in other use cases node-based collaboration system 100 may be utilized by two users, e.g., users 108b and 108c, or more than three users.

It is noted that, as defined in the present application, the expression "machine learning model" or "ML model" may refer to a mathematical model for making future predictions based on patterns learned from samples of data or "training data." Various learning algorithms can be used to map correlations between input data and output data. These correlations form the mathematical model that can be used to make future predictions on new input data. Such a predictive model may include one or more logistic regression models, Bayesian models, or neural networks (NNs). Moreover, a "deep neural network," in the context of deep learning, may refer to an NN that utilizes multiple hidden layers between input and output layers, which may allow for learning based on features not explicitly defined in raw data. In various implementations, NNs may be trained as classifiers and may be utilized to perform image processing, audio processing, or natural language processing, among other tasks.

It is noted that the components of node-based collaboration system 100. i.e., UI 110, node-based distribution and collaboration subsystem 120, automated conflict resolution and recommendation subsystem 130, automated memory space 140 providing temporary storage of creative assets during collaboration, long-term data storage 102, data processor/compiler 104, and data mapper/processor 106 can be implemented in a cloud-based environment, an on-premises environment, or a hybrid environment including both cloud-based and on-premises resources. It is further noted that the creative assets subject to collaboration among editor 108a, client 108b, and vendor 108c may be sourced from any of the previously identified environments, i.e., cloud-based, on-premises, or hybrid.

It is also noted that long-term data storage 102 and automated memory space 140 may take the form of any computer-readable non-transitory storage media. The expression "computer-readable non-transitory storage media." as used in the present application, refers to any media, excluding carrier waves or other transitory signals that provide instructions to processing hardware of node-based collaboration system 100, such as data processor/compiler 104 and data mapper/processor 106. Thus, computer-readable non-transitory storage media may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs such as DVDs, RAM, programmable read-only memory (PROM), erasable PROM (EPROM), and FLASH memory.

The processing hardware included in data processor/compiler 104 and data mapper/processor 106 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as the conflict avoidance software code executed by node-based distribution and collaboration subsystem 120, from the system memory of node-based collaboration system 100, while a GPU may be implemented to reduce the processing overhead of the CPU by performing computationally intensive graphics or other processing tasks. A TPU is an application-specific integrated circuit (ASIC) configured specifically for artificial intelligence (AI) processes such as machine learning.

In some implementations, node-based collaboration system 100 may include one or more web servers, accessible over a packet-switched network such as the Internet, for example. Alternatively, node-based collaboration system 100 may include one or more computer servers supporting a private wide area network (WAN), local area network (LAN), or included in another type of limited distribution or private network. In addition, or alternatively, in some implementations, node-based collaboration system 100 may utilize a local area broadcast method, such as User Datagram Protocol (UDP) or Bluetooth, for example, or a high-speed network suitable for high performance computing (HPC), for instance, such as a 10 GigE network or an Infiniband network. Furthermore, in some implementations, node-based collaboration system 100 may be implemented virtually, such as in a data center. For example, in some implementations, node-based collaboration system 100 may be implemented in software, or as virtual machines.

Figure 2A:
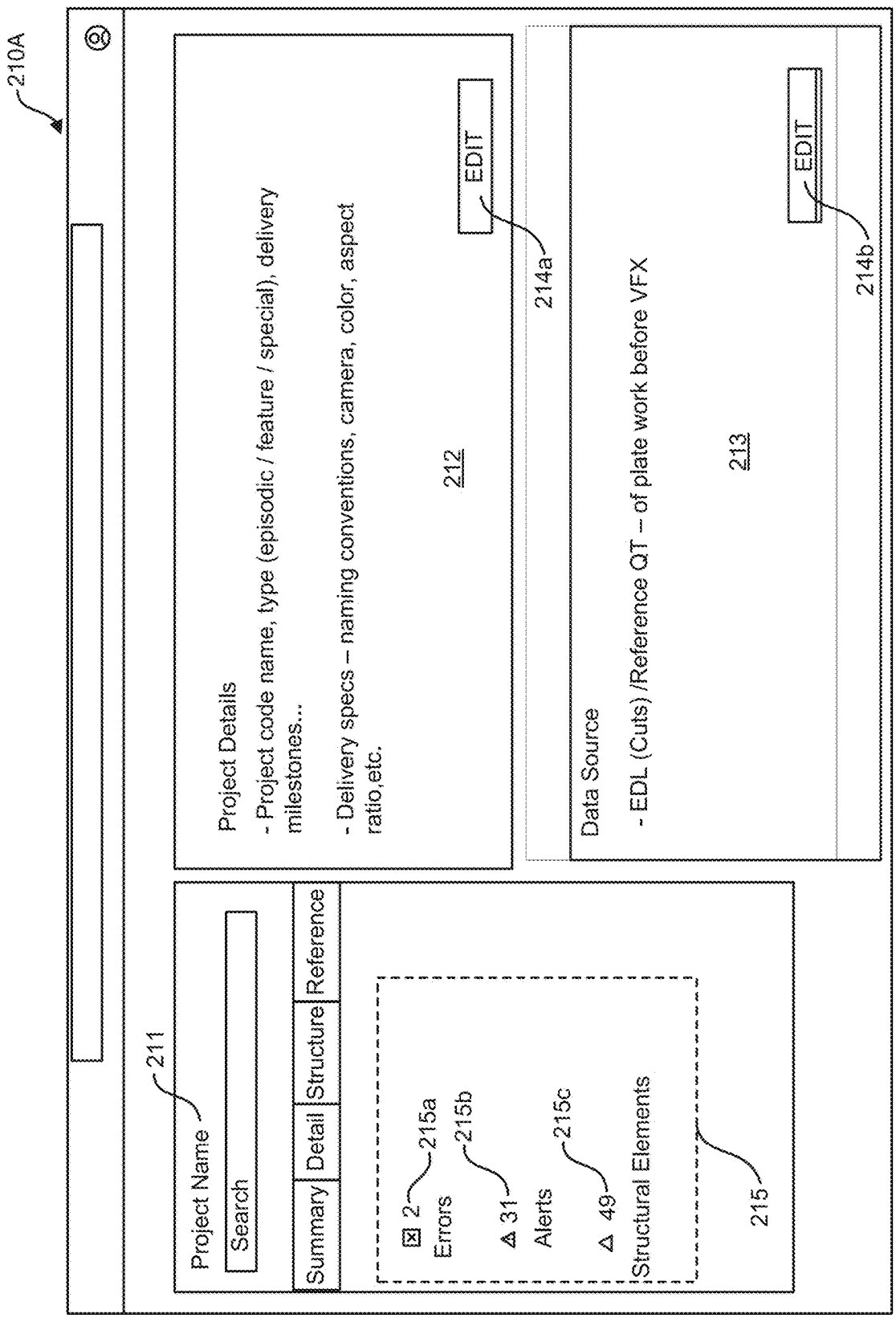
FIG. 2A shows an exemplary dashboard provided by a user interface (UI) of the node-based collaboration system shown in FIG. 1, according to one implementation.

A. UI 110:

FIGS. 2A, 2B, 2C, and 2D show various dashboards provided by UI 110, in FIG. 1, according to one exemplary implementation. FIG. 2A shows project creation dashboard 210A where project details can be specified. For example, the dashboard shown in FIG. 2A can be used to identify project name 211 and features 215 associated with the project, which may include errors 215a, alerts 215b, and structural elements 215c, for example. Structural elements 215c may be any graph element, such as a node, or a branch. In addition, the dashboard shown in FIG. 2A includes project details field 212 and editorial assignments field 213, which may be populated using respective edit actuators 214a and 214b to include vendor assignments, media content such as video, images, and the like, and EDLs, for example.

Figure 2B:
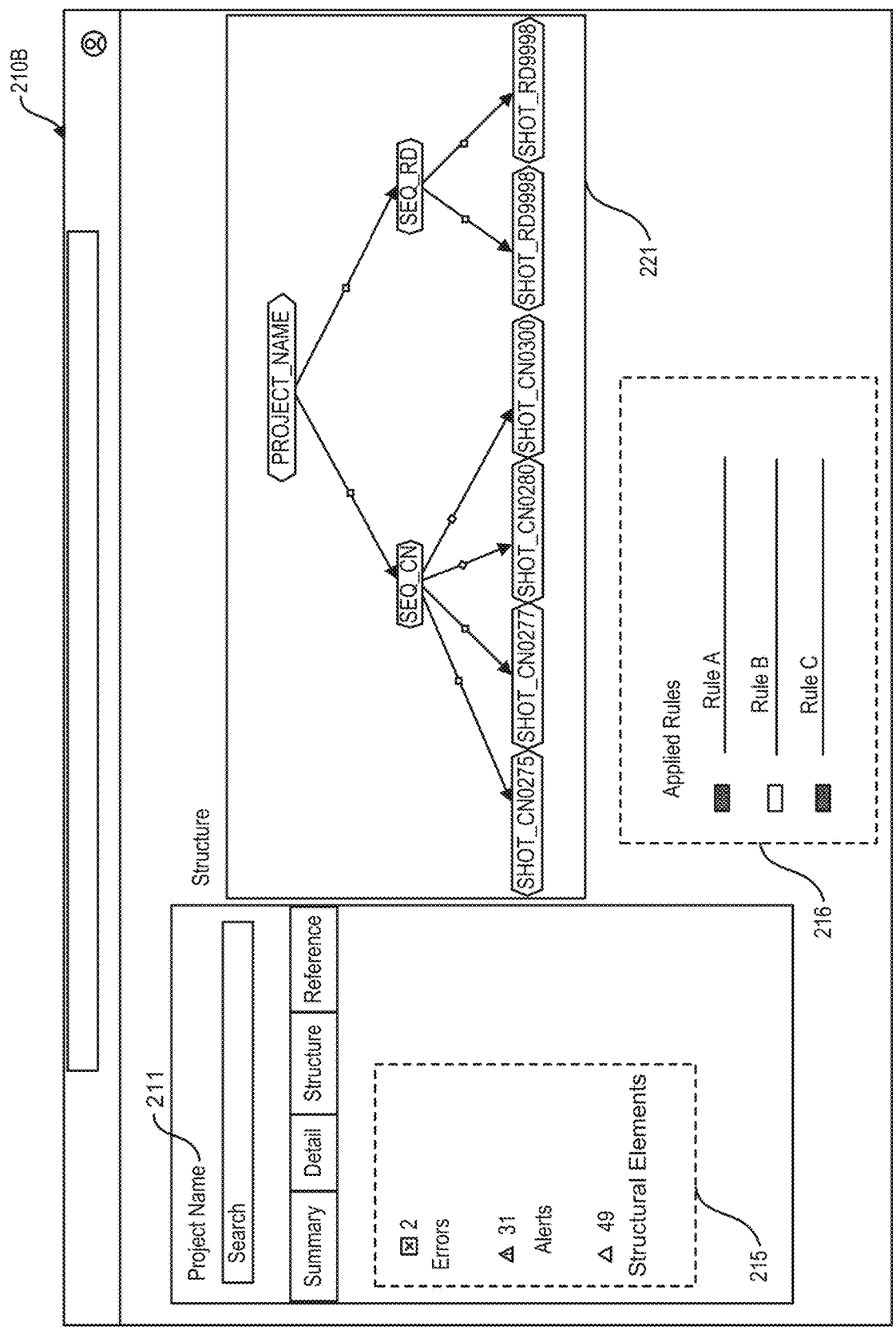
FIG. 2B shows another exemplary dashboard provided by the UI of the node-based collaboration system shown in FIG. 1, according to one implementation.

Dashboard 210B, in FIG. 2B, shows an exemplary visual interactive node-based project graph window provided by UI 110 that allows users (e.g., users 108a-108c in FIG. 1) to explore project 211 and its dependencies via node-based project graph 221. Applied rules section 216 provides client 108b with control over what rules should be applied to node-based project graph 221. In the example of FIG. 2B, Rules "A" and "C" are selected for application, while Rule "B" is not selected for application.

Figure 2C:
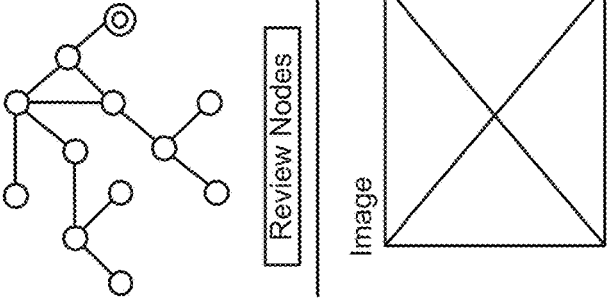
FIG. 2C shows another exemplary dashboard provided by the UI of the node-based collaboration system shown in FIG. 1, according to one implementation.

FIG. 2C shows exemplary client review dashboard 210C provided by UI 110. Client review dashboard 210C gives client 108b control of managing and accepting changes submitted by vendor 108c, as well as giving client 108b or vendor 108c control of resolving conflicts or preventing potential future conflicts related to a task or tasks assigned to vendor 108c by client 108b. Conflicts and potential future conflicts 217 are presented for review. In addition, client 108b can use client review dashboard 210C to proceed with creative review 218.

Figure 2D:
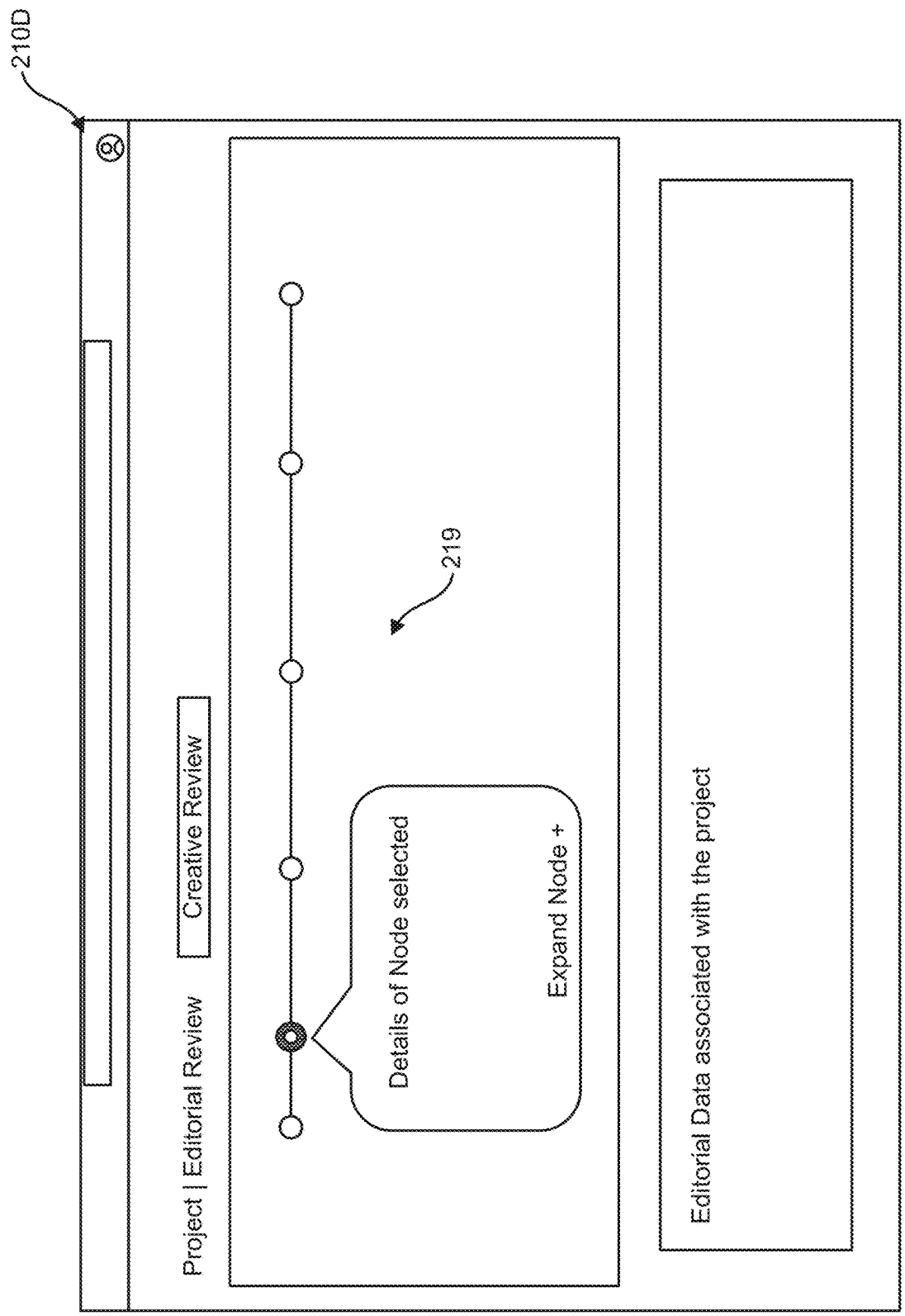
FIG. 2D shows yet another exemplary dashboard provided by the UI of the node-based collaboration system shown in FIG. 1, according to one implementation.

FIG. 2D shows an exemplary editorial review dashboard 210D provided by UI 110. As shown by FIG. 2D, editorial review dashboard 210D may be much simpler than the visual interactive node-based project graph window shown in FIG. 2B. In editorial review dashboard 210D shown in FIG. 2D, the complexity of the node-based project graph dependencies may be flattened into a single line of nodes 219 representing the latest cut. It is noted that although flattening could be included in other dashboards as well, from a practical standpoint most users of those other dashboards would not need the flattened view. Potentially, views associated with visual effects (VFX) supervisors might benefit from flattening, but this would be user-dependent.

B. Node-Based Distribution and Collaboration Subsystem 120:

Media production assets are typically organized hierarchically—sequences are composed of shots, reels are composed of sequences, full feature-length films are composed of reels—and the arrangement of those assets may be shifted by iterative editorial adjustments throughout the filmmaking process. As a result, a graph-based system is well suited to represent those assets and all associated dependencies when tracking changes. Regarding the term "reels," it is noted that the notion of reels is merely a custom for the industry, based on the legacy of physical film reels. Such physical film reels are not used for digital media content, but the language "reels" as applied to segments of a show such as a full feature-length film persists.

Figure 3A:
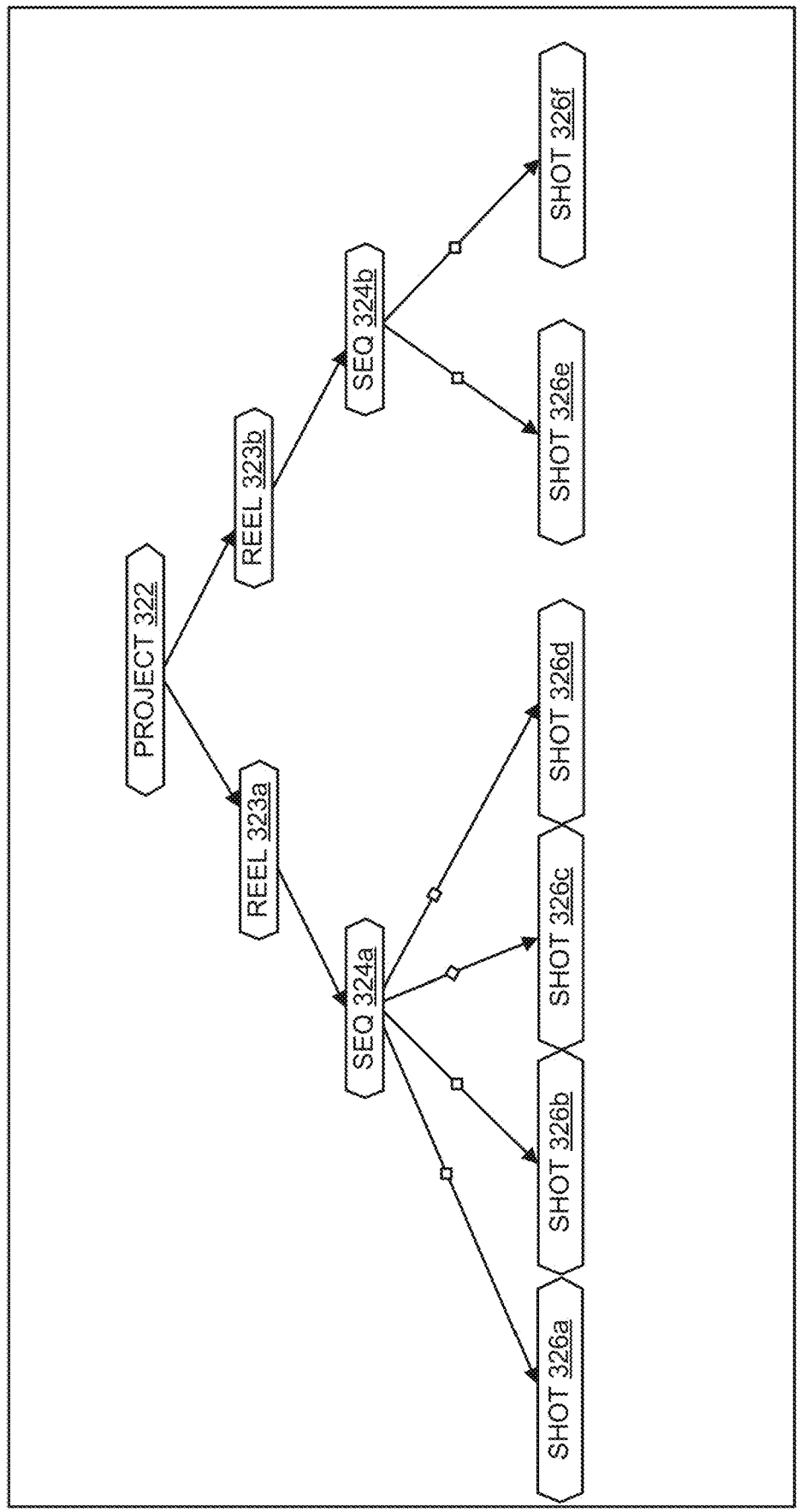
FIG. 3A shows an exemplary node-based project graph generated by the node-based collaboration system shown in FIG. 1, according to one implementation.
Figure 3B:
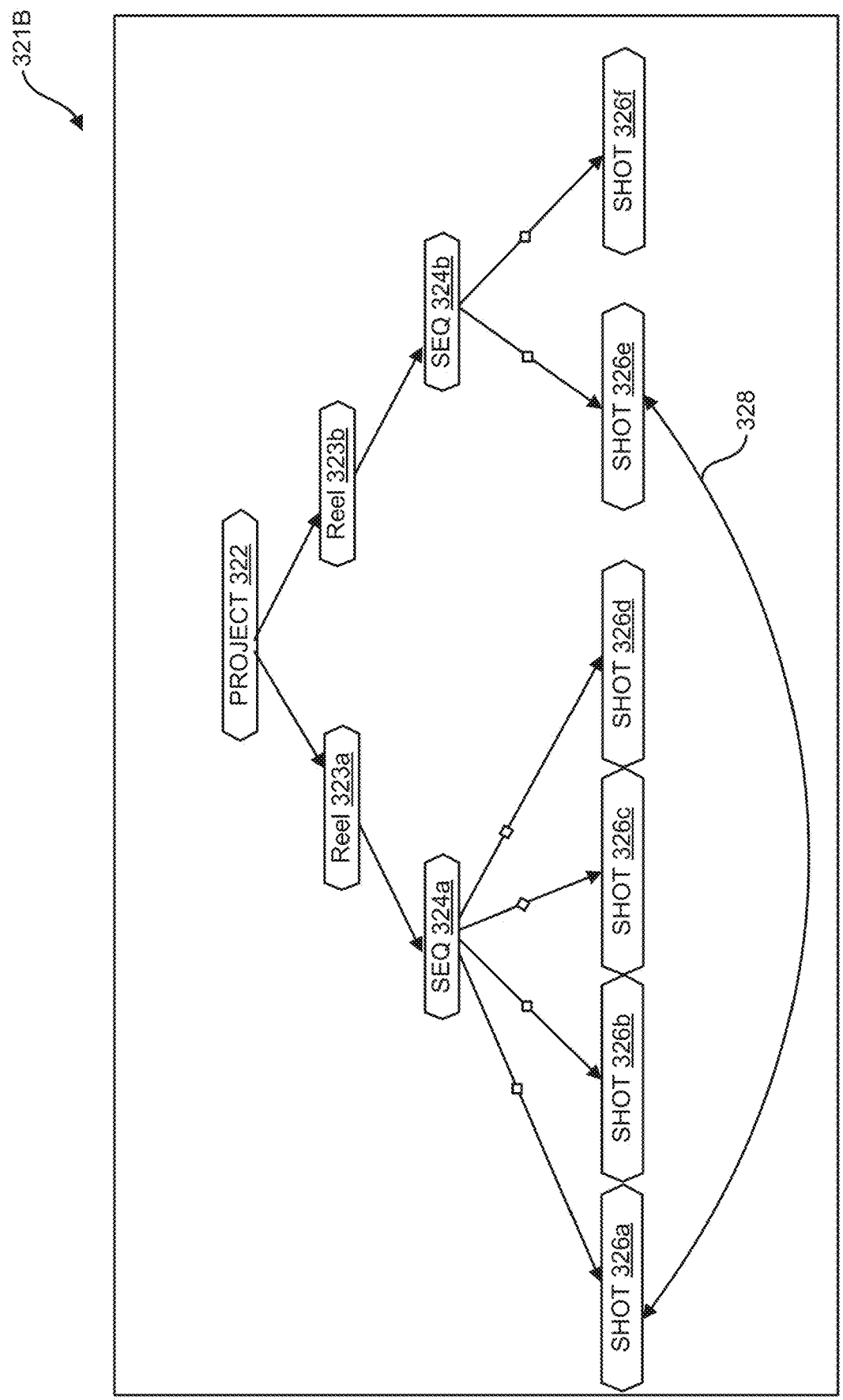
FIG. 3B shows another exemplary representation of the node-based project graph shown in FIG. 3A.

The present node-based control and collaboration solution employs a hierarchical graph representation with optional bidirectional flow capability, such that the base hierarchy includes nodes and edges to represent the hierarchical relationships among nodes. For example, referring to FIGS. 3A and 3B. FIGS. 3A and 3B show respective node-based graphs 321A and 321B of project 322 corresponding to a feature-length film, and including reels 323a and 323b and sequences 324a and 324b, as well as the shots included in each sequence. It is noted that although project 322 is described as corresponding to a feature-length film in the interests of conceptual clarity, more generally a project such as project 322 may correspond to any "show." Moreover, the term "show" is standard terminology in the art and refers to the entirety of a creative presentation. Sequence 324a is shown to include shots 326a. 326b, 326c, and 326d (hereinafter "shots 326a-326d"), while sequence 324b is shown to include shots 326e and 326f. In this example, sequences 324a and 324b have a different number of shots. In other examples, sequences 324a and 324b may have the same number of shots. It is noted that, although not shown in FIGS. 3A and 3B, in other implementations, node-based graphs 321A and 321B may depict additional hierarchical levels such as "versions," as known in the art, depending from one or more of shots 326a-326d, 326e, and 326f. By way of example, shots can have multiple versions based on different takes, different internal VFX operations applied to them, different color schemes being applied, and other potential adjustments.

As shown in FIGS. 3A and 3B, shot 326a belongs to sequence 324a, which belongs to project 322, and so forth. In addition, there can be any number of relational edges that may be bidirectional and can connect different asset nodes to each other depending on different content or structural elements. For example, if shot 326a and shot 326e represent the same chronological scene in the story narrative, but are split up into different sequences for a non-linear story arc, relational edge 328 may be added, as shown in FIG. 3B, to represent that chronological closeness.

It is noted that although FIGS. 3A and 3B show exemplary node-based graphs 321a and 321b having a top-down hierarchy in the interests of conceptual clarity, those representations are merely provided by way of example. More generally, the node-based graphs disclosed by the present application may be multi-dimensional graphs having two, three, or more than three dimensions. In those multi-dimensional implementations, a node-based graph may include multiple orthogonal axes and may include multiple hierarchical dimensions corresponding respectively to those orthogonal axes. For example, a three-dimensional node-based graph including a vertical "z" axis, a left-right "x" axis, and an in-out "y" axis may have a z component top-down or bottom-up hierarchy, an x component left-right or right-left hierarchy, and a y component in-out or out-in hierarchy.

Automated Node-Based Graph Generator:

Node-based graphs 321A and 321B may be automatically generated from an edit decision list (i.e., an EDL). Automated graph generation can be achieved by encoder-decoder machine learning frameworks similar to those implemented in the biomedical sphere and described, for example, by Wengong Jin, Regina Barzilay. and Tommi Jaakkola in "Hierarchical Generation of Molecular Graphs using Structural Motifs," accessible at https://arxiv.org/abs/2002.03230, the contents of which are hereby incorporated fully by reference into the present application. However, automated graph generation can also be achieved by simpler means. An example workflow for producing a node-based asset graph from editorial information, making use of pre-established project hierarchy (e.g., version, shot, sequence, reel, show), and combining bottom-up and top-down techniques is described below:

Bottom-Up Graph Building:

In bottom-up graph building, an EDL parser parses the EDL file(s) into the appropriate structured information, including filenames (e.g., the filename for project 322), node identifiers (e.g., shot 326a and sequence 324a), and timing. All shots and versions are then ordered within the EDL (e.g., shot 326a comes before shot 326b according to timestamps). Each EDL is treated as a sequence-level node and its shots contained as shot-level nodes. The resulting EDL sequence nodes are then ordered according to timestamp sequencing.

Top-Down Graph Building:

As shown by FIGS. 3A and 3B, in top-down graph building, sequences are divided among reels each representing a predetermined time duration of film, such as approximately 18 minutes, for example. It is noted that this may involve splitting a sequence-level node into two parts if its full sequence timeframe spans over a reel-break; in this case the sequence node is repeated so that one belongs to the preceding reel node with the appropriate shot nodes making up to 18 minutes total, and the repeated sequence node belongs to the subsequence reel node, with its remaining shot nodes continuing the rest of the sequence. By way of example, although not shown in FIGS. 3A and 3B, assume the following: the full sequence timeframe of sequence node 324a exceeds the time duration of the reel identified by reel node 323a. In that instance, sequence node 324a may be partitioned to provide sequence node 324a-1 belonging to reel node 323a and including shot nodes 326a. 326b, and 326c, and into sequence node 324a-2 belonging to reel node 323b and including shot 326d. It is noted that in this particular instance, both shot sequence node 324a-2 including shot node 326d and sequence node 324b including shot nodes 326e and 326f would belong to reel node 323b.

As further shown by FIGS. 3A and 3B, the ordered reel nodes are joined under a single parent project node 322. (Note, for ordering and visualization purposes, sequential nodes may be displayed from left to right such that leftmost nodes correspond to being "first" in the linear sequence). The result is a complete hierarchical graph representation of the project and its assets. Note: if there aren't given shots for certain timestamps of the proposed final timeline (that is, after building the graph from timestamp sequencing information there are gaps in the timestamps), one implementation of the system may make use of that gap information to input default placeholder nodes until a later EDL specifies the file information to go there, but another implementation may simply ignore the gaps and rely on future input EDLs to grow the graph, such that the graph starts smaller earlier in development and grows as nodes are added.

Bidirectional Relational Edges:

For certain implementations, in addition to the base hierarchical graph, additional information about connections and relationships between scenes or sequences (and therefore the assets that compose those scenes and sequences) may be added, either manually or by importing metadata with each asset. For example, if a system automatically tags each asset for location, actor, or story beat, that metadata can be imported along with the asset and EDL. Assets with the same metadata tags can receive a designed relational edge for that metadata type (e.g., a "chronology" relation might be differentiated from a "location" relation). It is noted that relational edges may be designated by any meaningful aspect shared across the media, including but not limited to location, chronology within the story, storyline, color, or music.

Once the node-based graph has been automatically generated, it may be displayed to the user for verification. Once a complete graph has been confirmed, subsequent edits will identify only those nodes to which changes have been made.

Graph-Based Identification of Potential Conflicts:

Given a set of changes to a set of nodes, node-based distribution and collaboration subsystem 120 can check all edge connections of the changed nodes to identify all other nodes that have been affected by that/those change(s), continuing onward to other more remotely connected nodes until there are no more affected nodes, and produce a list of affected nodes. The direction of information flow can be important to limit the graph search. For example, the effects of a change to a node may only flow up the graph, and not down such that a change to shot node 326a of sequence 324a may affect sequence node 324a and its reel node 323a, but will not affect shot node 326e of sequence node 324b, which is a sister node to sequence 324a, in this instance neither up nor down but parallel to sequence node 324a. Alternatively, if changes are made to shot node 326a but settings are such that changes do not flow upward, then the changes to shot node 326a would not affect sequence node 324a or reel node 323a. If there are bidirectional relational edges connecting sister or cousin nodes, then those nodes may be affected. In some implementations, separate lists of hierarchically affected nodes and relationally affected nodes may be produced.

Alternatively, when edits entail graph structure reworking, then the node-based graph may be regenerated by the automated node-based graph generator and node-based distribution and collaboration subsystem 120 may compare the previous graph to the new graph to identify blocks of change. e.g., subgraph similarity measures such as those described by Kanigalpula Samanvi and Naveen Sivadasan in "Subgraph Similarity Search in Large Graphs," accessible at https://arxiv.org/abs/1512.05256, and by Jaya Thomas. Dongmin Seo, and Lee Sael in "Review on Graph Clustering and Subgraph Similarity Based Analysis of Neurological Disorders." accessible at https://www.ncbi.nlm.nih.gov/pmc/articles/PMC4926396/, the contents of each of which are hereby incorporated fully by reference into the present application. In this case, nodes within identified subgraphs can be checked using the approach described above in the previous paragraph to generate the list of all affected nodes.

The graphical representation of the affected nodes with the list of predicted changes can be displayed to the user for verification and conflict resolution. In some implementations, node-based distribution and collaboration subsystem 120 can also support a graph search function so that the user can initiate a graph search to identify all points of possible conflict in the event of a change to a particular node.

Machine Learning-Based Change Identification in Visual Assets:

In addition to producing a list of affected nodes (and their files), an ML computer vision module may be implemented to identify what type of change occurred by analyzing the image/video directly. For example, flagging a change in a certain area of the screen, or a specific update to a highlighted character (e.g., the value for the classification of "actor" may change from version 1 of a shot to version 2 of that shot when using a facial recognition model on both versions). A number of different computer vision models could be implemented, depending on the needs of the user(s).

C. Automated Conflict Resolution and Recommendation Subsystem 130:

When automated conflict resolution and recommendation subsystem 130 detects a conflict or potential future conflict with media for a project, it may: (a) do nothing but flag the issue and allow the user to resolve it. (b) if the model has data on similar issues that have previously been resolved, flag the issue and suggest a conflict avoidance strategy based on previous successful resolutions, or (c) perform the conflict avoidance strategy in an automated process. Examples of such issues or conflicts may include situations in which applied color is wrong, shot length is wrong, or retiming has not been applied, to name a few. If (b), users may be prompted to accept or reject a conflict avoidance strategy suggested by automated conflict resolution and recommendation subsystem 130. If the reconciliation is rejected, the user may be asked a second question: Was this flag helpful or not? Based on these two sets of inputs (accept/reject and helpful/unhelpful), automated conflict resolution and recommendation subsystem 130 can use active learning, as described below, to improve the algorithm used to detect conflicts and potential future conflicts. It should be noted that these two sets of inputs are merely exemplary, and automated conflict resolution and recommendation subsystem 130 may accept additional inputs for this purpose.

Suggesting Conflict Resolutions:

As noted above, automated conflict resolution and recommendation subsystem 130 may suggest a conflict avoidance strategy using a simple rule-based approach or a more complex ML-based approach using a reinforcement learning loop. In either the simple case or the reinforcement learning case, feedback from the user can be utilized to more accurately flag conflicts and issues of real concern while less often flagging differences that are not a problem.

Simple rules method: for a given set of known types of conflicts, automated conflict resolution and recommendation subsystem 130 may suggest a known resolution. For example, version 1 of shot 1 is replaced by version 2, but this version node has a relational edge to shot 4 that has the tag "color scheme: sepia." A rule that enforces all "color scheme" relational edge connected nodes to have the same color tag, may suggest to the user that version 2 should have "color scheme: sepia."

To incorporate active learning in this approach, a list of suggested conflicts and associated resulting user preferences can be stored with conflict resolution rules in a conflict database and referred to. For example, each time users respond by accepting or rejecting a suggested conflict resolution or avoidance strategy, an appropriate down-weighting or up-weighting can be assigned to that strategy. As a result, an original list of multiple conflict resolution or avoidance strategies can be re-ranked based on each user acceptance or rejection, such that subsequent suggested strategies will be pulled from the highest ranked strategies and will more closely match user preferences, leading to quicker and more successful conflict resolution or avoidance (i.e., quicker, because if a user can immediately implement a conflict resolution or avoidance strategy without analyzing the problem themselves, time and resources are saved).

Deep reinforcement learning loop: a more complex system can be created for gradually learning conflict resolution strategies from a much wider pool of potential actions (wherein the pool of potential actions is still limited per the logic of automated conflict resolution and recommendation subsystem's 130 state boundaries; e.g., a reinforcement learning (RL) model learning how to walk from point A to point B should not suggest flying, likewise an RL model learning how to resolve conflicts in an existing node-based graph of a project should not suggest creating a new project graph).

When setting up a project, automated conflict resolution and recommendation subsystem 130 may allow client 108b to select which previous projects/shows are most similar to the new project. A model could be generated from the selected projects as the starting point for settings for the new project. Moreover, because a given project may involve months, even years, of work across thousands of asset pieces, opportunities exist for improved learning within a given project. Automated conflict resolution and recommendation subsystem 130 may learn and improve its conflict detection and prediction (both in terms of quality/accuracy and in terms of quantity/frequency), using user-input acceptances and rejections, as well as user-provided helpful/unhelpful ratings.

Automating Conflict Resolutions:

In some implementations, when a predetermined threshold of approval is reached, either from collected user preferences for a particular type of conflict or on success metrics of a reinforcement learning scheme, automated conflict resolution and recommendation subsystem 130 may stop presenting a particular conflict avoidance strategy to the user and may perform the conflict avoidance strategy in an automated process, thereby resulting in less unnecessary verification on the part of the user.

D. Automated Memory Space 140:

In order to enable concurrent collaboration for multiple users, there should be a component in place to enable the introduction of non-destructive changes to the shared data. In order to provide this feature, a component to manage memory storage for each collaborator is desirable. There are existing resources that can be used in cloud-based or on-premises environments capable of providing this functionality.

Temporary Storage Mechanism:

Existing cloud providers, like Amazon Web Services® (AWS®), have cloud native storage orchestrators to assist in management of this allocated storage. In addition, there is Kubernetes®, which assists in the management of storage clusters. Both of these frameworks allow users to automatically mount storage regardless of system and can conform to local or cloud providers.

In a cloud environment, an automated workflow for spinning up the necessary number of cloud instance nodes for storage, compute, or both, and spinning them back down as needed can assist in horizontal parallelization for varying compute needs. Alternatively, in an on-premises environment, standard practices may be utilized. Where a data center is present, a mechanism can be put in place to make application programming interface (API) requests to provision virtual machine storage and then attach it to a desired host. A host in this case, could be a container as the backend, and would be provisioned per collaborator making a change. Before a user would start working, a process on the host would need to format and mount it, then upon an event trigger from UI 110, reverse the process when completion is done. This could be done in conjunction with block (fast) storage for performant results.

Non-Destructive Change Workflow:

An original copy of the sourced media may be stored on centralized storage, accessible for viewing by all collaborators. i.e., editor 108*a*, client 108*b*, and vendor 108*c*. The storage allocation should not affect parties involved unless they opt to merge in changes to the current working version or request to make changes, e.g., version up the data. A temporary memory space (hereinafter "temporary storage") can be created for each collaborator upon starting to do work and storage can be removed when the changes have been finalized.

By taking advantage of existing solutions, whether on-premises, cloud-based, or hybrid, the following example process may be used to create temporary storage for creative use. First, temporary storage is created for each collaborator and temporary copies of the data are allocated for each collaborator. The temporary storage is registered in a database via a unique key to reference for creation and cleanup upon request. The collaborator can then make non-destructive changes to asset copy using their assigned temporary storage. In some use cases, the collaborator can temporarily opt out of updating global shared data while making experimental changes to copied data. That is to say, the node-based graph updates continually to reflect changes made by any collaborator, except when one or more of those collaborators opts/opt out to make experimental changes.

This approach provides several advantages. For example, it enables multiple collaborators to work on an asset without having the asset locked and unlocked. In addition, it allows for easier recognition and flagging of conflicting changes by different collaborators as well as easier identification and sequencing of consistent changes by collaborators.

Figure 4:
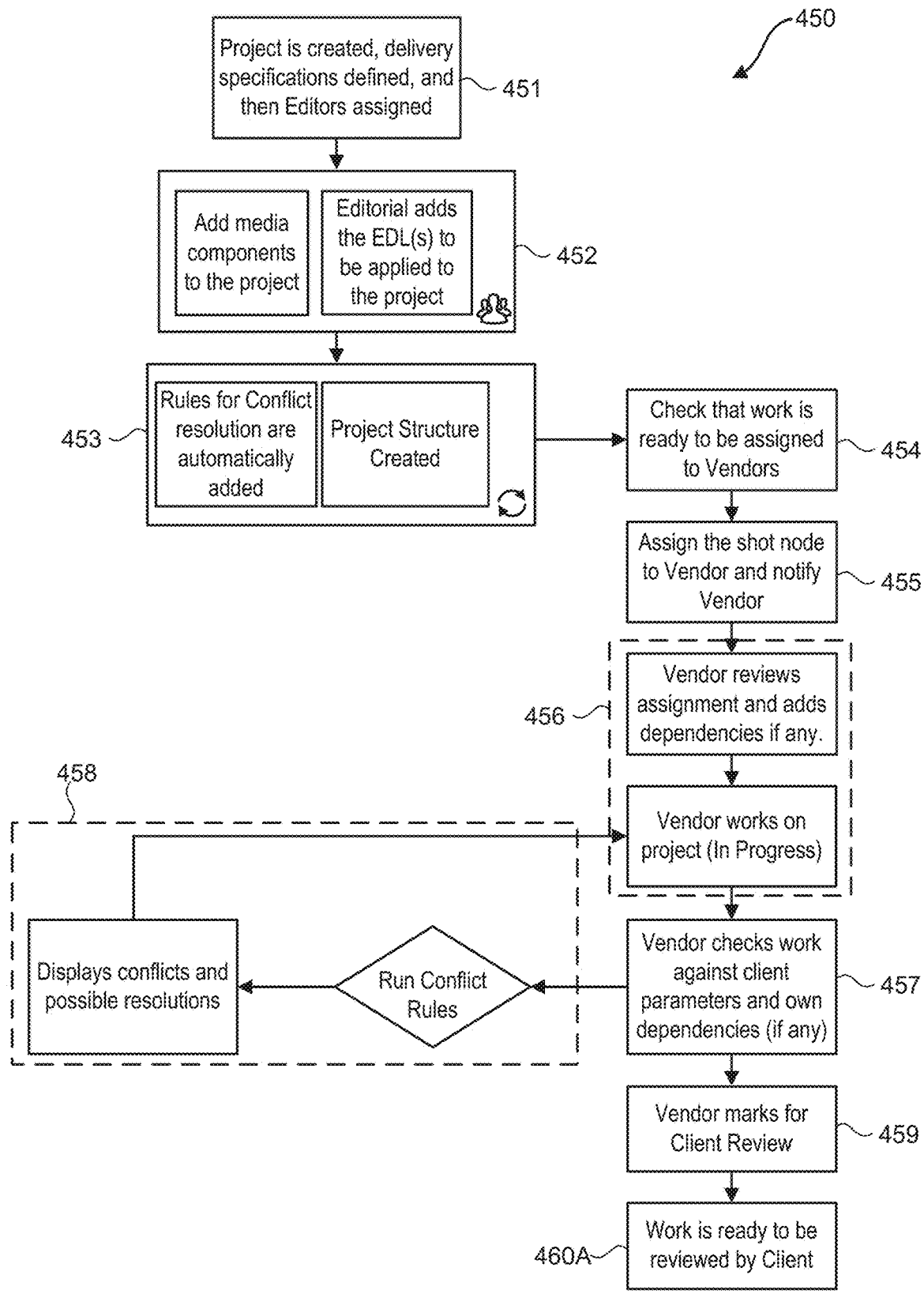
FIG. 4 shows an exemplary flow diagram outlining assignment of a project task to a system user, as well as progress and completion of the project task, according to one implementation.

Sample Workflow Utilizing Described Components:

A sample workflow using the present node-based control and collaboration system are shown in FIG. 4 is described below. Referring to flow diagram 450 in FIG. 4, an exemplary client and vendor workflow may include the following steps. As shown in FIG. 4, the workflow begins with client 108*b* creating a new project, identifying delivery specifications, and assigning one or more editors 108*a* to the project (action 451). It is noted that as used in the present application, the feature "editor 108*a*" may refer to a technical specialist collaborating with client 108*b*, a project manager, or an outside contractor (i.e., another vendor), to name a few examples.

Client 108*b* then points to required data in the project, including media components, and, if available, identifier(s) of previous project(s) that were similar in order to pull in the active learning model previously used in that project or projects. In addition, one or more editors 108*a* may provide one or more EDL(s) informing initial cuts and shots and also defining relationships between media assets (actions 452).

Automated graph creation module sets up initial graph relationships based on EDL input, and rules for conflict resolution are automatically added (actions 453). After creating a project, the node graph takes form based on the initial set of source data and settings. Client 108*b* now has the ability to see the current project and relationships between assets using hierarchical UI 110 to check that work is ready to assigned to vendor 108*c* (action 454). As part of action 454 client 108*b* can hover over or click on a node to explore deeper information, drag and drop to add or correct relationships, and create and update permissions, as well as administer accounts. One or more project tasks. e.g., shot(s), corresponding respectively to nodes of the node-based graph, may be assigned to vendor 108*c* and vendor 108*c* is notified of the assignment (action 455). Assignments can include additional metadata, notes, requirements, and the like, that are stored within the assignment reference to a node. After assignment has been made to vendor 108*c*, there is a notification and state registered within a database to indicate that upon next logout, temporary storage will be allocated for work to commence.

Once vendor 108*c* has been sent project task assignments, work begins on the vendor side (actions 456). Vendor 108*c* receives the project task assignment through hierarchical UI 110, and an event trigger is received to create temporary storage for the work by vendor 108*c*. This trigger happens when vendor 108*c* "accepts" the work. Vendor 108*c* now has two options. First, if vendor 108*c* chooses not to use this node-based control system to track their assignment, they may have the option to upload versions of media to be reviewed, e.g., composite, turntable, etc. They can create a description and provide notes with the media. Once the media and any associated descriptions and notes are uploaded, they are fed into the system to process changes. It is noted that the complexity of this particular workflow, i.e., client 108*b* using the system, vendor 108*c* completing work outside the system) allows the collaborative process to be standardized for every vendor. Second, if vendor 108*c* adopts this system into their own environment, they may begin by converting data and using available assignment tools compatible with the format of node-based control and collaboration system 100. This could be done through node-based control and collaboration system 100 to keep track and account for all departments in a project pipeline (e.g., compositing, animation, modeling, etc., not necessarily the actual plate or reference material provided by client 108*b*).

Whichever of the two options described above is adopted by vendor 108*c*, vendor 108*c* checks their work against parameters set by client 108*c*, as well as their dependencies, i.e., dependencies internal to vendor 108*c* (action 457), and checks for conflicts and their possible resolutions (action 458). It is noted that as vendor 108*c* does work, they have the ability to review and resolve conflicts with their media before publishing for review by client 108*b*. The conflicts for vendor 108*c* can be categorized as internal conflicts versus a conflict resolution report for client 108*b*. This gives vendor 108*c* the chance to review before submitting to client 108*b*. Vendor then marks the work for client review (action 459), and client 108*b* receive notifications in hierarchical UI 110 indicating that a change has been made by vendor 108*c* and that the work by vendor 108*c* is ready for review by client 108*b* (action 460A). The notifications received by client 108*b* in action 460A may inform client 108*b* that change has been made by vendor 108*c* and is ready for review, or may provide conflict information between previous and current iterations, as well as options for conflict resolution or avoidance.

Figure 6A:
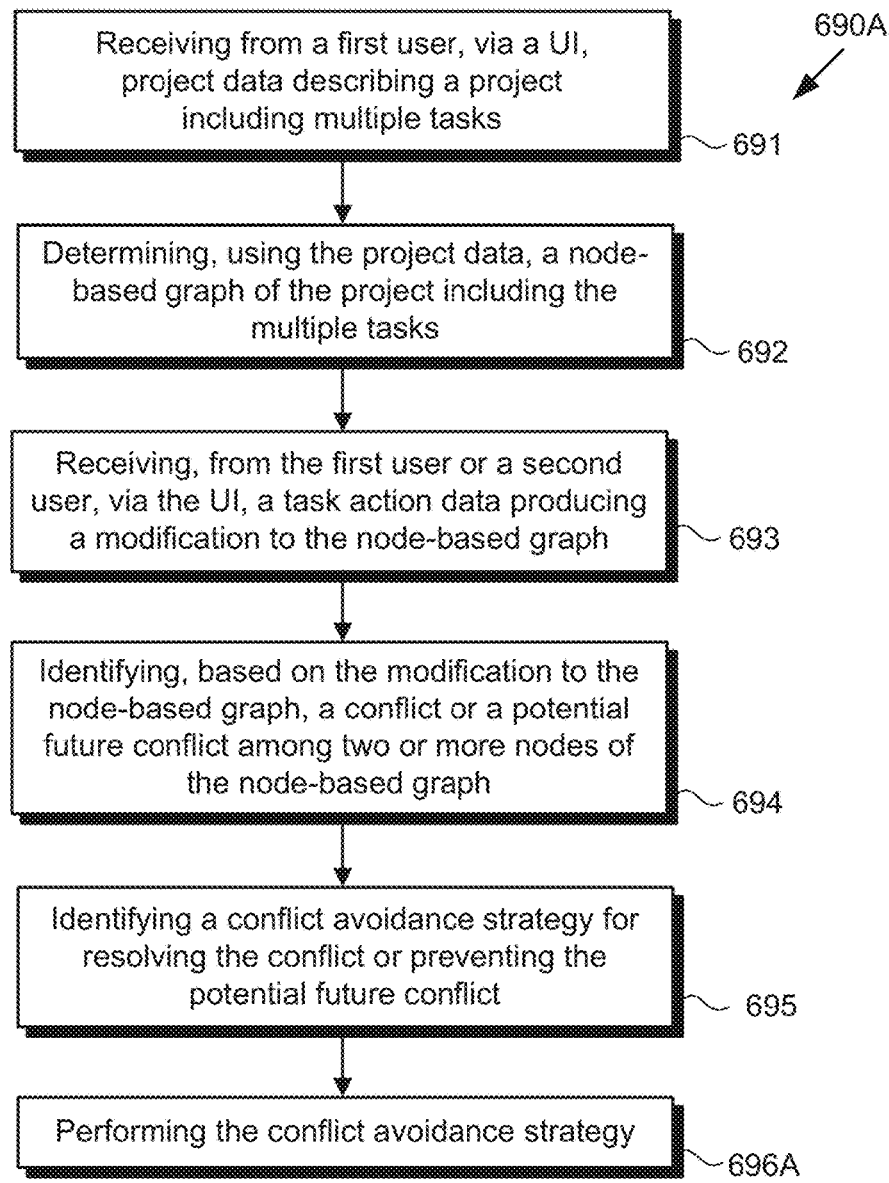
FIG. 6A shows a flowchart outlining a proactive conflict resolution method for use by a node-based collaboration system, according to one implementation.
Figure 6B:
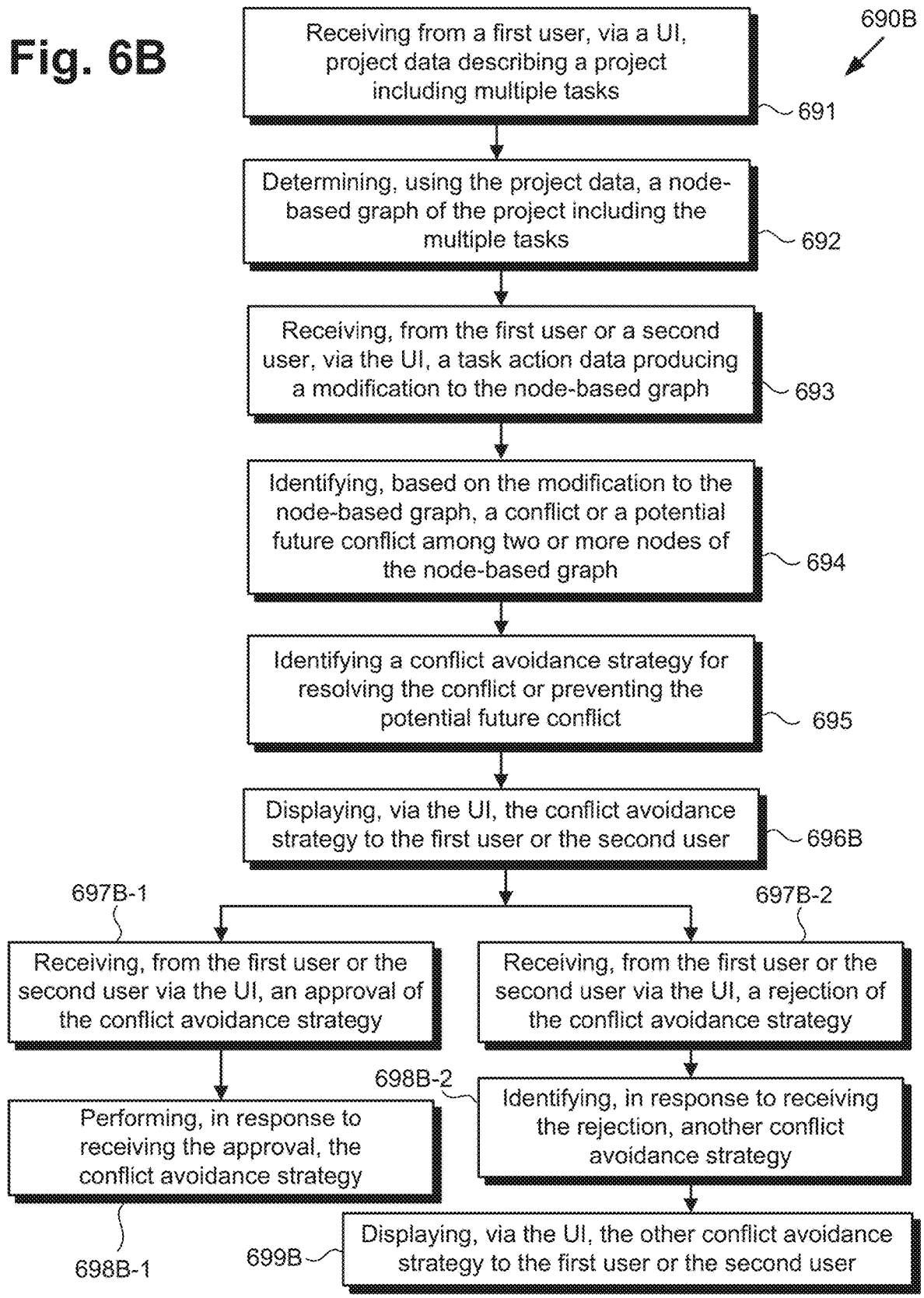
FIG. 6B shows additional actions for extending the method outlined in FIG. 6A.

The functionality of node-based collaboration system 100, in FIG. 1, will be further described by reference to FIGS. 6A and 6B. FIG. 6A shows flowchart 690A outlining a proactive conflict resolution method for use by node-based collaboration system 100, according to one implementation, while FIG. 6B shows flowchart 690B including additional actions for extending the method outlined by FIG. 6A. It is noted that the processing hardware described by reference to flowcharts 690A and 690B corresponds in general to data processor/compiler 104 and data mapper/processor 106, in FIG. 1. Thus, either or both of data processor/compiler 104 and data mapper/processor 106 may share any of the characteristics attributed to the processing hardware described by reference to flowcharts 690A and 690B by the present disclosure, and vice versa.

In addition, the conflict avoidance software code described by reference to flowcharts 690A and 690B corresponds in general to the conflict avoidance software code executed by automated conflict resolution and recommendation subsystem 130, as identified above. Consequently, the conflict avoidance software code executed by automated conflict resolution and recommendation subsystem 130 may share any of the characteristics attributed to the conflict avoidance software code described by reference to flowcharts 690A and 690B by the present disclosure, and vice versa. Moreover, with respect to the method outlined in FIGS. 6A and 6B, it is noted that certain details and features have been left out of flowcharts 690A and 690B in order not to obscure the discussion of the inventive features in the present application.

Referring to FIGS. 1 and 6A in combination, flowchart 690A includes receiving from a first user (hereinafter referred to as "client 108b"), via UI 110, project data identifying a project including multiple tasks (action 691). Referring to FIG. 2A, as noted above. FIG. 2A shows project creation dashboard 210A where project details can be specified by client 108b. For example, the dashboard shown in FIG. 2A can be used to identify project name 211 and features 215 associated with the project, which may include errors 215a, alerts 215b, and structural elements 215c, for example. In addition, the dashboard shown in FIG. 2A includes project details field 212 and editorial assignments field 213, each of which may be populated using edit actuator 214 to include vendor assignments, long play source material, and EDLs, for example. The project data may be received in action 691 by the conflict avoidance software code of automated conflict resolution and recommendation subsystem 130, executed by the processing hardware of node-based collaboration system 100.

Flowchart 690A further includes determining, using the project data received in action 691, a node-based graph of the project including the multiple tasks (action 692). Referring to FIG. 2B, dashboard 210B shows an exemplary visual interactive node-based project graph window provided by UI 110 that allows client 108b in FIG. 1 to explore project 211 and its dependencies via node-based project graph 221. As noted above. FIGS. 3A and 3B also show node-based graphs, which, according to the exemplary use case depicted by node-based graphs 321A and 321B of project 322, include nodes corresponding respectively to sequences 324a and 324b, as well as the shots included in each sequence. As further noted above, although not shown in FIGS. 3A and 3B, in other implementations, node-based graphs 321A and 321B may depict additional hierarchical levels such as various "versions," as known in the art and described above, depending from one or more of shots 326a-326d. 326e, and 326f.

In some implementations, the node-based graph of the project including the multiple tasks may be generated by node-based distribution and collaboration subsystem 120 of node-based collaboration system 100, and may be determined in action 692 by being identified in the project data received in action 691. However, in other implementations, determining the node-based graph in action 692 may include generating the node-based graph using the project data received in action 691. Action 692 may be performed by the conflict avoidance software code of automated conflict resolution and recommendation subsystem 130, executed by the processing hardware of node-based collaboration system 100.

Flowchart 690A further includes receiving from client 108b or a second user (hereinafter referred to as "vendor 108c"), via UI 110, task action data producing a modification to the node-based graph (action 693). It is noted that the feature "task action data" refers to data describing any actions executed by client 108b or vendor 108c that affects the task assigned to vendor 108c. Some actions performed by client 108b, or by vendor 108c in performing their assigned task may result in generation of task action data that has no effect on any node of the node-based graph except for the task node assigned to vendor 108c. However, some actions performed by client 108b, or by vendor 108c while performing their assigned task may inadvertently affect other nodes of the node-based graph and may give rise to conflicts or potential conflicts with tasks being performed by others, e.g., client 108b, one or more editors 108a, or other vendors. Thus, in action 693, task action data that does affect one or more other nodes of the node-based graph so as to produce a modification to the node-based graph is received from client 108b or vendor 108c.

For example, in use cases in which client 108b or vendor 108c works on one or more of the multiple tasks over more than one session, task action data may be received via UI 110 during, or at the end of, each session. The task action data may be received in action 691 by the conflict avoidance software code of automated conflict resolution and recommendation subsystem 130, executed by the processing hardware of node-based collaboration system 100.

Flowchart 690A further includes identifying, based on the modification to the node-based graph produced by the task action data received in action 693, one of a conflict or a potential future conflict among at least two nodes of the node-based graph (action 694). In some implementations, the modification to the node-based graph may be reported as a list of changes to nodes included in the graph. For example, given a set of changes to a set of nodes, the processing hardware of node-based collaboration system 100 may execute the conflict avoidance software code of automated conflict resolution and recommendation subsystem 130 to check all edge connections to the changed nodes to identify all other nodes that have been affected by that/those change(s), continuing onward to other more remotely connected nodes until there are no more affected nodes, and return the complete list of affected nodes.

Alternatively, or in addition, when edits entail graph structure reworking, node-based distribution and collaboration subsystem 120 of node-based collaboration system 100 may regenerate the node-based graph of the project. In some of those implementations, the processing hardware of node-based collaboration system 100 may execute the conflict avoidance software code of automated conflict resolution and recommendation subsystem 130 to compare the previous graph to the regenerated graph in order to identify blocks of change. In such use cases, nodes within identified blocks of change can be checked using the approach described above in the previous paragraph to generate the list of all affected nodes.

Flowchart 690A further includes identifying a conflict avoidance strategy for resolving the conflict or preventing the potential future conflict (action 695). As defined for the purposes of the present application, the expression "conflict avoidance strategy" refers to any action or actions directed to resolving an existing conflict or preventing a potential future conflict. Examples of conflict avoidance strategies may include reversing modifications to the node based graph giving rise to the conflict or potential future conflict, decoupling two or more nodes of the node based graph to eliminate the conflict or prevent the future potential conflict, or rearranging connections amongst some nodes of the node based graph to eliminate the conflict or prevent the future potential conflict. Identification of the conflict avoidance strategy in action 691 may be performed by the conflict avoidance software code of automated conflict resolution and recommendation subsystem 130, executed by the processing hardware of node-based collaboration system 100.

Figure 5A:
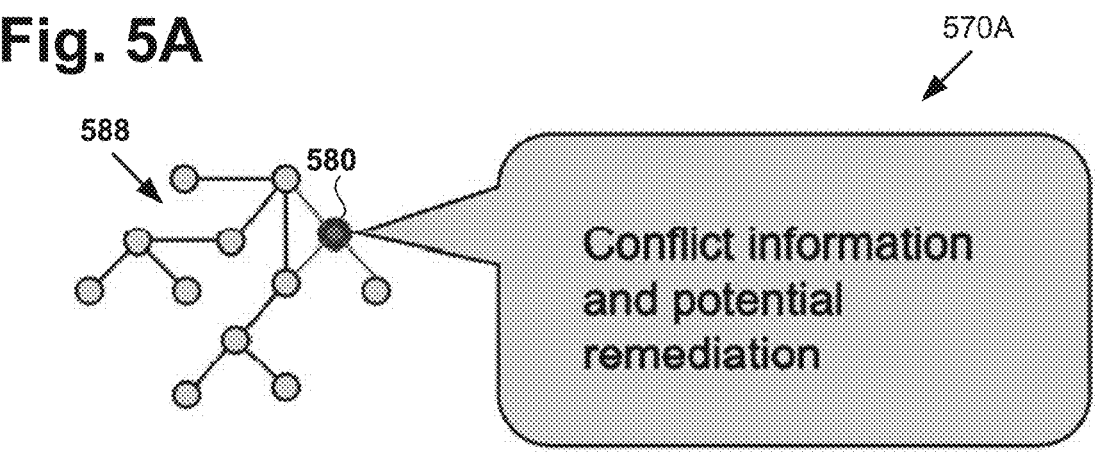
FIG. 5A shows a conflict alert generated in response to detection of a conflict or a potential future conflict, according to one implementation.

Referring to FIG. 5A, FIG. 5A shows exemplary conflict alert 570A generated in response to detection of a conflict or potential future conflict in action 694. As shown by conflict alert 570A, one or more changes to node 580 produced by the task action data received in action 693 has resulted in node 580 being identified as a source of conflict or potential future conflict with one or more other nodes of node-based graph 588. In some implementations, conflict alert 570A may identify the conflict or potential future conflict associated with node 580 and may optionally include a conflict avoidance strategy. It is noted that, in some implementations, conflict alert 570A may be displayed to client 108b or vendor 108c via UI 110, as discussed below by reference to FIG. 6B. However, in other implementations, conflict alert 570A may be an internal flag for automated conflict resolution and recommendation subsystem 130.

Figure 5B:
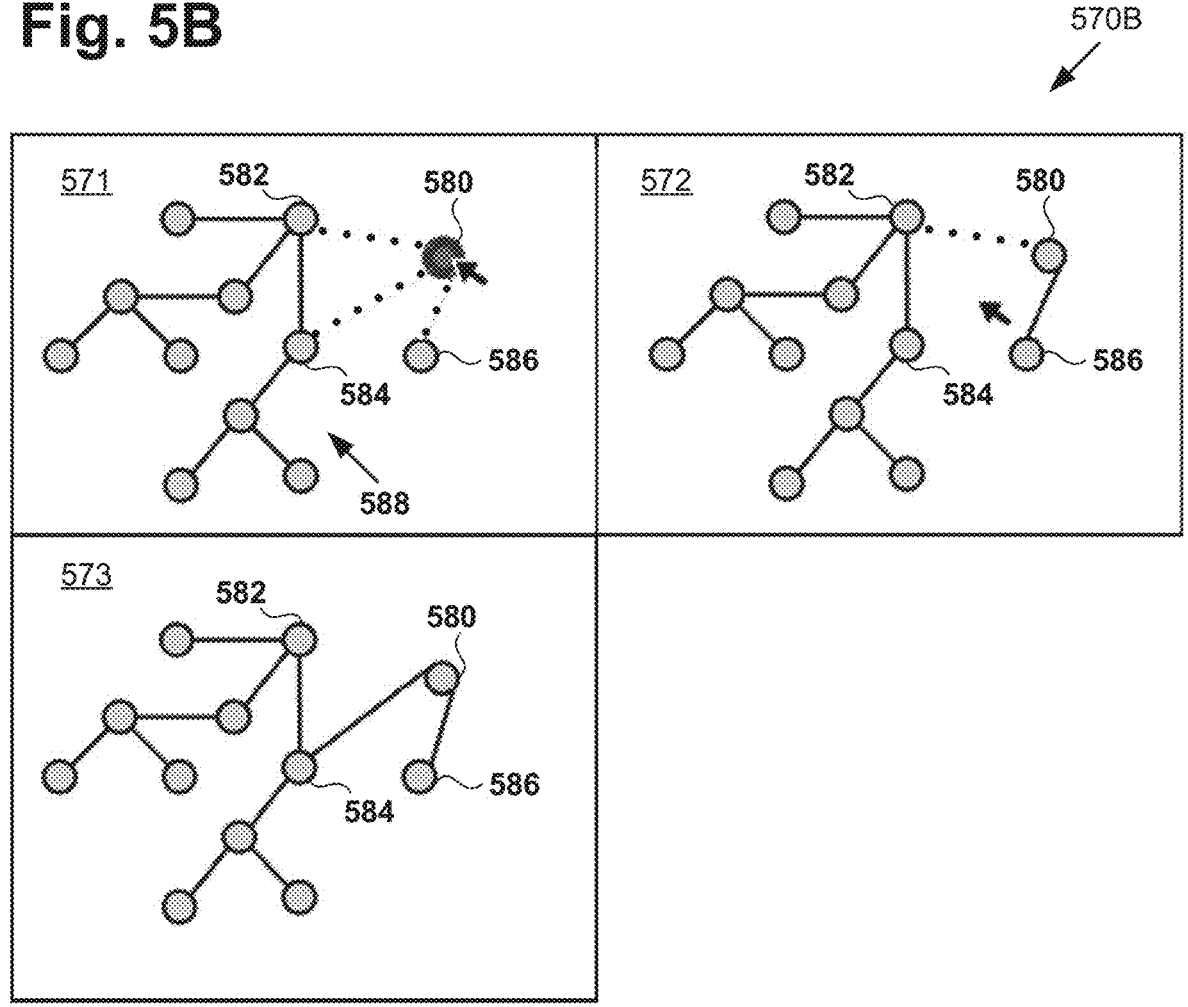
FIG. 5B depicts a conflict avoidance strategy for resolving a conflict or preventing a potential future conflict, according to one implementation.

Referring to FIG. 5B, diagram 570B in FIG. 5B depicts an exemplary process for identifying a conflict avoidance strategy in action 695. For example, as shown by panel 571 of diagram 570B, node 580 has been identified as being in conflict or potential future conflict with nodes 582, 584, and 586 of node-based graph 588. As shown by panel 572 of diagram 570B, a conflict avoidance strategy that simply decouples node 580 from 584 fails to eliminate the conflict or prevent the potential future conflict between nodes 580 and 582. However, as shown by panel 573 of diagram 570B, a conflict avoidance strategy that decouples node 580 from node 582 resolves the conflicts or prevents the potential future conflicts among nodes 580, 584, and 586.

As noted above, in some implementations, the memory resources of node-based collaboration system 100 may store a conflict database including multiple conflict resolution rules. In some of those implementations, before identifying the conflict avoidance strategy, the processing hardware of node-based collaboration system 100 may execute the conflict avoidance software code of automated conflict resolution and recommendation subsystem 130 to identify, based on the similarity of the detected conflict or potential future conflict to a previously resolved conflict, one or more relevant rules for resolving the conflict or preventing the potential future conflict from among the conflict resolution rules, and obtain the one or more relevant rules from the conflict database. In those implementations, the processing hardware of node-based collaboration system 100 may execute the conflict avoidance software code of automated conflict resolution and recommendation subsystem 130 to identify the conflict avoidance strategy in action 695 using those one or more relevant rules. It is noted that similarity amongst present or potential future conflicts and previously resolved conflicts may be determined based on a variety of factors, such as the parameters of the project identified by the project data received in action 691, the specific task giving rise to the conflict, the identity of vendor 108c, or the relative positions of the conflicting or potentially conflicting nodes within the hierarchy of the node-based graph, for example.

As noted above, in some implementations, the memory resources of node-based collaboration system 100 may store a trained conflict avoidance ML model. In some of those implementations, before identifying the conflict avoidance strategy, the processing hardware of node-based collaboration system 100 may execute the conflict avoidance software code of automated conflict resolution and recommendation subsystem 130 to predict, using the conflict avoidance ML model and the detected conflict or potential future conflict, one or more candidate strategies for resolving the conflict or preventing the potential future conflict. In those implementations, the processing hardware of node-based collaboration system 100 may execute the conflict avoidance software code of automated conflict resolution and recommendation subsystem 130 to identify the conflict avoidance strategy in action 695 from among the one or more candidate strategies.

According to the exemplary method outlined by FIG. 6A, flowchart 690A may conclude with performing the conflict avoidance strategy identified in action 695 (action 696A). In some implementations, as noted above, the conflict avoidance strategy may be performed in an automated process. The conflict avoidance strategy identified in action 695 may be performed in action 696A by the conflict avoidance software code of automated conflict resolution and recommendation subsystem 130, executed by the processing hardware of node-based collaboration system 100.

In some implementations, the method outlined in FIG. 6A may conclude with action 696A described above. However, in other implementations, the method outlined in FIG. 6A may be extended to include the additional actions shown in FIG. 6B. It is noted that actions 691, 692, 693, 694, and 695 (hereinafter "actions 691-695") in FIG. 6B correspond respectively to actions 691-695 in FIG. 6B and share the characteristics attributed to those corresponding actions above by reference to flowchart 690A.

Referring to FIG. 6B, as an alternative to action 696A, according to the exemplary implementation shown in FIG. 6B, flowchart 690B may include displaying, via UI 110, the conflict avoidance strategy identified in action 695 to client 108b or vendor 108c (action 696B). Referring to FIGS. 5A and 5B, action 696B may include displaying one or both of conflict alert 570A and diagram 570B to client 108b or vendor 108c via UI 110. Displaying the conflict avoidance strategy identified in action 695 to client 108b or vendor 108c in action 696B may be performed by the conflict avoidance software code of automated conflict resolution and recommendation subsystem 130, executed by the processing hardware of node-based collaboration system 100. It is noted that authority for approving or rejecting a proposed conflict avoidance strategy may be vested in client 108b, vendor 108c, or both, and may be specified by the project data received in action 691. Moreover, in use cases in which such authority is vested in both client 108b and vendor 108c, a decision hierarchy may also be specified by the project data so that if client 108b and vendor 108c disagree, one of their respective decisions prevails.

As further shown in FIG. 6B, in some implementations, flowchart 690B may continue with receiving from client 108b or vendor 108c, via UI 110, an approval of the conflict avoidance strategy identified in action 695 (action 697B-1). As noted above. FIG. 2C shows exemplary client review dashboard 210C provided by UI 110. The client review dashboard 210C gives client 108b control of managing and accepting changes submitted by vendor 108c, and also gives client 108b or vendor 108c control of resolving conflicts or preventing potential future conflicts related to a task or tasks assigned to vendor 108c by client 108b. Conflicts and potential future conflicts 217 are presented for review. Approval of the conflict avoidance strategy identified in action 695 may be received in action 697B-1 by the conflict avoidance software code of automated conflict resolution and recommendation subsystem 130, executed by the processing hardware of node-based collaboration system 100.

In implementations in which the method outlined in FIG. 6B includes action 697B-1, flowchart 690B also includes performing, in response to receiving the approval in action 697B-1, the conflict avoidance strategy (action 698B-1). The conflict avoidance strategy identified in action 695 may be performed in action 698B-1 by the conflict avoidance software code of automated conflict resolution and recommendation subsystem 130, executed by the processing hardware of node-based collaboration system 100.

Alternatively. and as also shown in FIG. 6B, in some implementations, flowchart 690B may include receiving from client 108b or vendor 108c, via UI 110, a rejection of the conflict avoidance strategy identified in action 695 (action 697B-2). As noted above, FIG. 2C shows exemplary client review dashboard 210C provided by UI 110. The client review dashboard 210C gives client 108b control of managing and accepting changes submitted by vendor 108c, and also gives client 108b or vendor 108c control of resolving conflicts or preventing potential future conflicts related to a task or tasks assigned to vendor 108c by client 108b. Conflicts and potential future conflicts 217 are presented for review. The rejection of the conflict avoidance strategy identified in action 695 may be received in action 697B-2 by the conflict avoidance software code of automated conflict resolution and recommendation subsystem 130, executed by the processing hardware of node-based collaboration system 100.

In some implementations in which the method outlined in FIG. 6B includes action 697B-2, flowchart 690B may also include identifying, in response to receiving the rejection in action 697B-2, another conflict avoidance strategy (action 698B-2). The other conflict avoidance strategy may be identified using a process analogous to any or those described above by reference to action 695 of flowchart 690A, and may be performed in action 698B-2 by the conflict avoidance software code of automated conflict resolution and recommendation subsystem 130, executed by the processing hardware of node-based collaboration system 100.

In implementations in which the method outlined in FIG. 6B includes actions 697B-2 and 698B-2, flowchart 690B may also include displaying, via UI 110, the other conflict avoidance strategy identified in action 697B-2 to client 108b or vendor 108c (action 699B). As noted above, FIG. 2C shows exemplary client review dashboard 210C provided by UI 110. As further noted above, the client review dashboard 210C gives client 108b or vendor 108c control of resolving conflicts or preventing potential future conflicts related to a task or tasks assigned to vendor 108c by client 108b. Conflicts and potential future conflicts 217 are presented for review. The display, via UI 110, of the other conflict avoidance strategy identified in action 698B-2 may be provided to client 108b or vendor 108c by the conflict avoidance software code of automated conflict resolution and recommendation subsystem 130, executed by the processing hardware of node-based collaboration system 100. It is noted that in use cases in which the other conflict resolution strategy displayed in action 699B is also rejected by client 108b or vendor 108c, action 699B loops to occupy the position on flowchart 690B of action 696B, actions 697B-2, 698B-2 and 699B may repeat until a displayed conflict avoidance strategy is approved by client 108b or vendor 108c.

Alternatively, in some use cases in which a rejection of the conflict avoidance strategy identified in action 695 is received from client 108b or vendor 108c, via UI 110, client 108b or vendor 108c may implement a conflict avoidance strategy devised or identified by that client 108b or vendor 108c themselves. i.e., a "user implemented conflict avoidance strategy." In those use cases, the processing hardware of node-based collaboration system 100 may execute the conflict avoidance software code of automated conflict resolution and recommendation subsystem 130 to receive from client 108b or vendor 108c, via UI 110, the user implemented conflict avoidance strategy for resolving the conflict or preventing the potential future conflict, and store the user implemented conflict avoidance strategy in the system memory of node-based collaboration system 100 for use in identifying future conflict avoidance strategies. As yet another alternative, in some use cases, the user implemented conflict resolution strategy will not be stored in the system memory of node-based collaboration system 100, but will rather be performed as a one-time strategy.

Thus, the present application discloses systems and methods providing proactive conflict resolution in node-based collaboration systems. In addition to rendering collaborations between clients and vendors more efficient and less duplicative of proprietary or otherwise sensitive data and assets, the present node-based collaboration solutions could be beneficial to non-client/vendor relationships as well, for example production studios where all of the work is performed in-house, but requires collaboration among a complex web of interacting teams that may all be working in parallel on overlapping parts of a project. The present node-based collaboration solutions advance the state-of-the-art at least by eliminating or significantly decreasing duplication of data among clients and vendors, centralizing data storage, thereby reducing file transfer time and effort, reducing workflow maintenance on the vendor and client sides, thereby reducing development time and cost, and reducing project turnaround time. In addition, the node-based control and collaboration systems and methods disclosed in the present application can advantageously notify clients and vendors of changes to their assignments or file "unlocked" status for making changes to a creative asset automatically, as well as provide a version control/hash system to reduce archival storage needs and facilitating roll-back to previous version of a creative asset.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
a processing hardware, a user interface (UI), and a system memory storing a software code and a conflict avoidance machine learning (ML) model trained using a deep reinforcement learning;
the processing hardware configured to execute the software code to:
receive from a first user, via the UI, project data describing a project including a plurality of tasks;

determine, using the project data, a node-based graph of the project including the plurality of tasks;
receive from one of the first user or a second user, via the UI, task action data producing a modification to the node-based graph;
identify, based on the modification to the node-based graph, a conflict among at least two nodes of the node-based graph;
predict, using the conflict avoidance ML model and the conflict, one or more candidate strategies for resolving the conflict;
identify, using the conflict avoidance ML model and based on the one or more candidate strategies in an automated process independent of the first user and the second user, a conflict avoidance strategy for resolving the conflict, wherein the conflict avoidance strategy comprises decoupling a node of the node-based graph;
display, via the UI, the node-based graph, a conflict alert indicating the node in the node-based graph and the conflict avoidance strategy to the one of the first user or the second user;
receive, via the UI, an input from the one of the first user or the second user to decouple the node indicated by the conflict alert;
in response to receiving the input, decouple the node indicated by the conflict alert;
display, via the UI, the node-based graph with the node decoupled from the node-based graph; and
further train the conflict avoidance ML model, using the deep reinforcement learning and the input from the one of the first user or the second user, to improve the conflict avoidance ML model in a feedback loop.

2. The system of claim 1, wherein the system memory further stores a conflict database including a plurality of conflict resolution rules, and wherein the processing hardware is further configured to execute the software code to:
before identifying the conflict avoidance strategy, identify, based on a similarity of the conflict to a previously resolved conflict, one or more relevant rules for resolving the conflict from among the plurality of conflict resolution rules; and
wherein identifying the conflict avoidance strategy is further based on the one or more relevant rules.

3. A system comprising:
a processing hardware, a user interface (UI), and a system memory storing a software code and a conflict avoidance machine learning (ML) model trained using deep reinforcement learning;
the processing hardware configured to execute the software code to:
receive from a first user, via the UI, project data describing a project including a plurality of tasks;
determine, using the project data, a node-based graph of the project including the plurality of tasks;
receive from one of the first user or a second user, via the UI, task action data producing a modification to the node-based graph;
identify, based on the modification to the node-based graph, a potential future conflict among at least two nodes of the node-based graph;
predict, using the conflict avoidance ML model and the conflict, one or more candidate strategies for preventing the potential future conflict;
identify, using the conflict avoidance ML model and based on the one or more candidate strategies in an automated process independent of the first user and the second user, a conflict avoidance strategy for preventing the potential future conflict, wherein the conflict avoidance strategy comprises decoupling a node of the node-based graph;
display, via the UI, the node-based graph, a conflict alert indicating the node in the node-based graph and the conflict avoidance strategy to the one of the first user or the second user;
receive, via the UI, an input from the one of the first user or the second user to decouple the node indicated by the conflict alert;
in response to receiving the input, decouple the node indicated by the conflict alert;
display, via the UI, the node-based graph with the node decoupled from the node-based graph; and
further train the conflict avoidance ML model, using the deep reinforcement learning and the input from the one of the first user or the second user, to improve the conflict avoidance ML model in a feedback loop.

4. A method for use by a system including a processing hardware, a user interface (UI), and a system memory storing a software code and a conflict avoidance machine learning (ML) model trained using deep reinforcement learning, the method comprising:
receiving from a first user, by the software code executed by the processing hardware and via the UI, project data identifying a project including a plurality of tasks;
determining, by the software code executed by the processing hardware and using the project data, a node-based graph of the project including the plurality of tasks;
receiving from one of the first user or a second user, by the software code executed by the processing hardware and via the UI, task action data producing a modification to the node-based graph;
identifying, by the software code executed by the processing hardware and using the conflict avoidance ML model and based on the modification to the node-based graph, one of a conflict or a potential future conflict among at least two nodes of the node-based graph;
predicting, by the software code executed by the processing hardware and using the conflict avoidance ML model and the identified one of the conflict or the potential future conflict, one or more candidate strategies for one of resolving the conflict or preventing the potential future conflict;
identifying, by the software code executed by the processing hardware based on the one or more candidate strategies, in an automated process independent of the first user and the second user, a conflict avoidance strategy for the one of resolving the conflict or preventing the potential future conflict, wherein the conflict avoidance strategy comprises decoupling a node of the node-based graph;
displaying, by the software code executed by the processing hardware and via the UI, the node-based graph, a conflict alert indicating the node in the node-based graph and the conflict avoidance strategy to the one of the first user or the second user;
receiving, by the software code executed by the processing hardware and via the UI, an input from the one of the first user or the second user to decouple the node indicated by the conflict alert;
in response to receiving the input, decouple, by the software code executed by the processing hardware, the node indicated by the conflict alert;

in response to receiving the input, displaying, by the software code executed by the processing hardware and via the UI, the node-based graph with the node decoupled from the node-based graph; and further training, by the software code executed by the processing hardware, the conflict avoidance ML model, using the deep reinforcement learning and the input from the one of the first user or the second user, to improve the conflict avoidance ML model in a feedback loop.

5. The method of claim 4, wherein the system memory further stores a conflict database including a plurality of conflict resolution rules, the method further comprising:

identifying, by the software code executed by the processing hardware based on a similarity of the detected one of the conflict or the potential future conflict to a previously resolved conflict, one or more relevant rules for the one of resolving the conflict or preventing the potential future conflict from among the plurality of conflict resolution rules; and wherein identifying the conflict avoidance strategy is further based on the one or more relevant rules.

6. The system of claim 1, wherein the conflict avoidance strategy comprises reversing the modification to the node-based graph.

7. The system of claim 3, wherein the conflict avoidance strategy comprises reversing the modification to the node-based graph.

8. The method of claim 4, wherein the conflict avoidance strategy comprises reversing the modification to the node-based graph.

* * * * *